US007350694B2

(12) United States Patent
Burgess

(10) Patent No.: US 7,350,694 B2
(45) Date of Patent: Apr. 1, 2008

(54) SYSTEM AND METHOD FOR NARROWCASTING ITEM TRACKING

(75) Inventor: David S. Burgess, Newark Valley, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/218,747

(22) Filed: Aug. 14, 2002

(65) Prior Publication Data

US 2004/0031846 A1 Feb. 19, 2004

(51) Int. Cl.
*G06F 17/00* (2006.01)

(52) U.S. Cl. ....................................... 235/375; 235/383

(58) Field of Classification Search ................ 235/375, 235/383, 385, 462.01, 462.02, 462.09, 462.1; 705/22, 26, 28, 404, 406
See application file for complete search history.

(56) References Cited

U.S. PATENT DOCUMENTS

| | | | | |
|---|---|---|---|---|
| 4,823,204 | A * | 4/1989 | Holland | 386/130 |
| 4,832,204 | A * | 5/1989 | Handy et al. | 209/3.3 |
| 5,043,908 | A | 8/1991 | Manduley et al. | 364/478 |
| 5,313,051 | A | 5/1994 | Brigida et al. | 235/375 |
| 5,401,944 | A * | 3/1995 | Bravman et al. | 235/375 |
| 5,420,403 | A | 5/1995 | Allum et al. | 235/375 |
| 5,602,382 | A | 2/1997 | Ulvr et al. | 235/494 |
| 5,635,694 | A | 6/1997 | Tuhro | 235/375 |
| 5,866,888 | A * | 2/1999 | Bravman et al. | 235/375 |
| 5,869,819 | A | 2/1999 | Knowles et al. | 235/375 |
| 5,920,056 | A * | 7/1999 | Bonnet | 235/383 |
| 5,929,415 | A * | 7/1999 | Berson | 235/382 |
| 6,101,487 | A | 8/2000 | Yeung | 705/410 |
| 6,220,509 | B1 * | 4/2001 | Byford | 235/375 |
| 6,285,916 | B1 * | 9/2001 | Kadaba et al. | 700/222 |
| 6,356,196 | B1 * | 3/2002 | Wong et al. | 340/571 |
| 6,415,983 | B1 * | 7/2002 | Ulvr et al. | 235/487 |
| 6,501,854 | B1 * | 12/2002 | Konishi et al. | 382/181 |
| 6,772,130 | B1 * | 8/2004 | Karbowski et al. | 705/26 |
| 6,976,007 | B1 * | 12/2005 | Boucher et al. | 705/28 |

* cited by examiner

*Primary Examiner*—Thien M. Le
*Assistant Examiner*—Kumiko C. Koyama
(74) *Attorney, Agent, or Firm*—Michael Best & Friedrich, LLP

(57) ABSTRACT

Using a unique, mailer applied PLANET bar code offered by the U.S. Postal Service (USPS), a mail tracking system automatically sends an electronic message to the mailer once mail passes through mail processing machines at each USPS facility. The message to the mailer preferably includes the location of the mail, the time and date the mail is in the USPS facility, and optionally the destination of the mail.

18 Claims, 2 Drawing Sheets

SYSTEM AND METHOD FOR NARROWCASTING ITEM TRACKING

FIELD OF THE INVENTION

This invention relates generally to the field of tracking items shipped by a shipping service, and more particularly to a system and method for automatically notifying customers of the location of an item during the shipping process.

BACKGROUND OF THE INVENTION

Today, the U.S. Postal Service (USPS) does not have the capability to automatically track mail as it passes from MPM (mail processing machine) to MPM and from city to city within the USPS's national network, i.e., the USPS infrastructure. Mailers only have visibility to mail pieces when mail reaches its final destination via certain USPS offerings such as Delivery Confirmation.

The prior art is replete with user queries to mail piece databases. For example, U.S. Pat. No. 6,220,509 (Byford) describes a parcel trace system which keeps updated tracking information in a database accessible by customers via the Internet. U.S. Pat. No. 6,101,487 (Yeung) describes an electronic manifest that is reconciled with barcoded information on each parcel as the parcels are sorted. U.S. Pat. No. 5,869,819 (Knowles et al.) describes a Web-based package routing, tracking, and delivery system that makes package information accessible by customers via the Internet. U.S. Pat. No. 5,602,382 (Ulvr et al.) describes a bar code with a tracker element in it so that tracking information is accessible by customers. U.S. Pat. No. 5,420,403 (Allum et al.) describes a bar code and system which allows a customer to track and trace a parcel throughout the sortation system. U.S. Pat. No. 5,043,908 (Manduley et al.) describes a self-monitoring mail delivery system which allows a customer to access package tracking information. U.S. Pat. No. 5,313,051 (Brigida et al.) describes a parcel tracking system which sends parcel status information to a central data location. U.S. Pat. No. 5,635,694 (Tuhro) describes an embedded postal code which permits tracking a piece of mail through the mail handling system.

SUMMARY OF THE INVENTION

Briefly stated, using a unique, mailer applied PLANET bar code offered by the U.S. Postal Service (USPS), a mail tracking system automatically sends an electronic message to the mailer once mail passes through mail processing machines at each USPS facility. The message to the mailer preferably includes the location of the mail, the time and date the mail is in the USPS facility, and optionally the destination of the mail.

According to an embodiment of the invention, a method for tracking items includes the steps of (a) assigning a unique code to an item; (b) sending said unique code associated with a sender ID to a database, wherein said sender ID is uniquely associated with a sender; (c) applying said unique code to said item; (d) reading said unique code at at least one item handling facility; (e) querying said database to determine which sender ID is associated with said read code; (f) sending data associated with said item from said at least one item handling facility to said database; and (g) sending said data associated with said item from said database to said sender.

According to an embodiment of the invention, a program storage device readable by a machine, tangibly embodies a program of instructions executable by a machine to perform method steps for tracking items, wherein said method steps include the steps of (a) assigning a unique code to an item; (b) sending said unique code associated with a sender ID to a database, wherein said sender ID is uniquely associated with a sender; (c) applying said unique code to said item; (d) reading said unique code at at least one item handling facility; (e) querying said database to determine which sender ID is associated with said read code; (f) sending data associated with said item from said at least one item handling facility to said database; and (g) sending said data associated with said item from said database to said sender.

According to an embodiment of the invention, a system for tracking items includes means for assigning a unique code to an item; means for sending said unique code associated with a sender ID to a database, wherein said sender ID is uniquely associated with a sender; means for applying said unique code to said item; means for reading said unique code at at least one item handling facility; means for querying said database to determine which sender ID is associated with said read code; means for sending data associated with said item from said at least one item handling facility to said database; and means for sending said data associated with said item from said database to said sender.

DETAILED DESCRIPTION OF THE PREFERRED EMBODIMENT

The USPS (U.S. Postal Service) recently launched PLANET, a barcode that permits tracking of both inbound and outbound letter mail in addition to parcels. The PLANET bar codes complement the existing POSTNET barcodes. The PLANET barcodes, filly described in the USPS Manual on PlanetCodes, are required by the USPS in order to use their new CONFIRM service. CONFIRM provides confirmation that customers received the mail, thereby allowing mailers to synchronize telemarketing programs with direct mail campaigns or augment other advertising media with their mailings.

Figure 1:
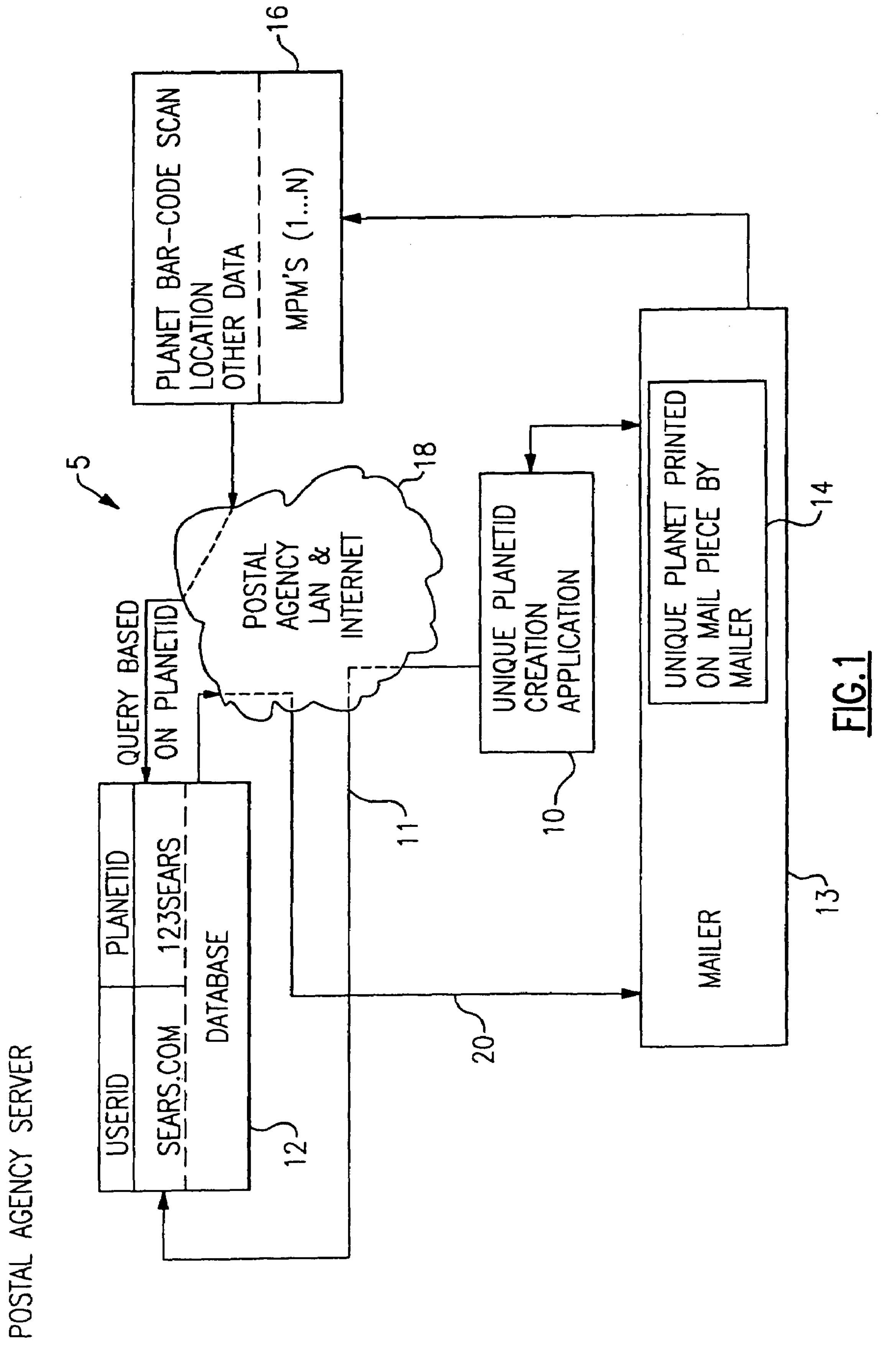
FIG. 1 shows a schematic of an item tracking and notification system according to an embodiment of the invention.

Referring to FIG. 1, a system 5 according to an embodiment of the present invention is shown. An application 10 of the USPS determines a unique identifier for each mailer and stores this unique identifier in a database 12 as shown by a path 11, preferably over the Internet. This unique identifier (e.g., SEARS.com=planetID 123SEARS) is given by application 10 to the mailer for mail piece tracking. The unique bar code (unique to the mailer, i.e., 123SEARS) is printed on the mail piece by the mailer 13 with date/time/unique mail information as shown in block 14. As mail is processed by various USPS mail processing machines (MPM's) 16, when PLANET code is detected, specific information applied by the mailer is lifted from the mail piece in the form of an image. Once the image is lifted, a query is sent to database 12 via the Postal Agency LAN and/or Internet 18 based on the unique bar code assigned by the USPS for the mailer. An electronic address (e.g., sears.com) is found in database 12 for the mailer within the USPS's server infrastructure.

Additional information from MPM 16 is preferably sent to database 12 as part of the query to be used later in the electronic message to the mailer.

An electronic message is sent from database 12 via LAN and/or Internet 18 to the mailer containing the mailer's applied data along with the specific location/city/date time information supplied to database 12 by the USPS's mail processing equipment in the MPM, as shown by link 20. Mailer 13 receives information, preferably the location of the mail piece, the date/time at the location, and the unique identifier of the mail piece, if applied by the mailer.

Thus, mailers could automatically/electronically track "special" mail as it passes through the USPS infrastructure and use the information to plan better delivery times/dates of critical mail to customers. This invention differs from the prior art in at least one respect in that it automatically provides the mailer with information based on user supplied bar code information that is unique to the mailer as opposed to merely permitting the mailer to track mail in response to a query. The end user (mailer) can then automatically keep track of specific pieces of mail as they move from postal facility to postal facility.

Figure 2:
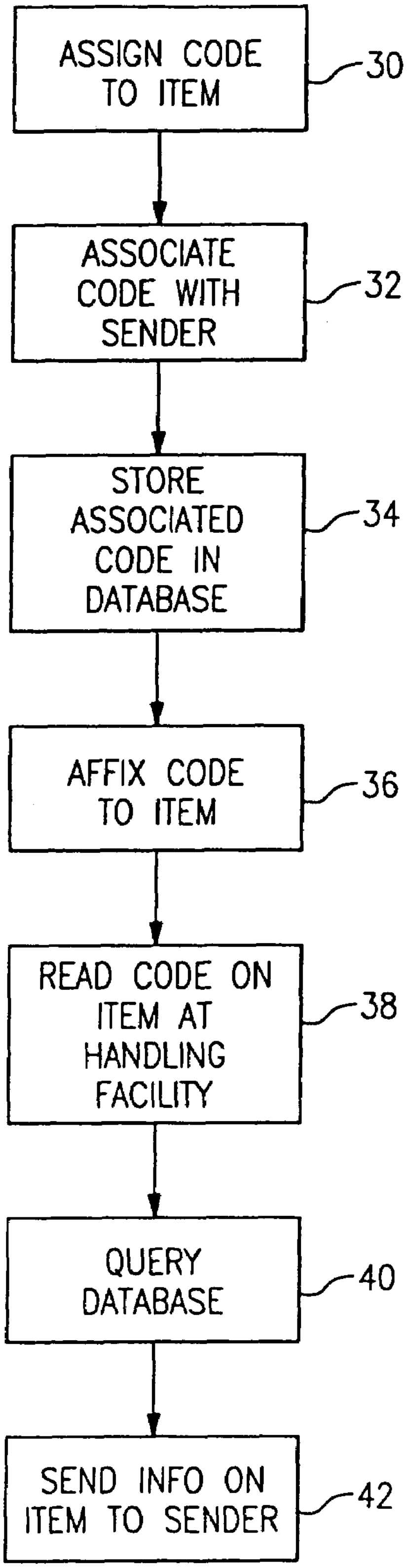
FIG. 2 shows a flow chart of a method for tracking and notifying mailers according to an embodiment of the invention.

Referring to FIG. 2, a flow chart of a method according to an embodiment of the present invention is shown. In step 30, a unique code is assigned to an item to be shipped by a shipping company. The code is associated with a sender in step 32. In step 34, the code associated with the sender is stored in a database which is accessible by the shipping company, preferably via the Internet. The sender affixes the code to the item in step 36. In step 38, when the item is processed by the shipper through one or more handling facilities, each facility reads the code along with other data generated by the handling facility and sends the code and data to the database to determine what sender is associated with the code in step 40. The code and data are then sent to the identified sender in step 42 without any actions required on the part of the sender. That is, tracking status is automatically generated and sent to the sender by the shipper whenever the shipped item passes through a handling facility.

This invention is of potential financial value to companies that need to track critical document or parcels. An example of a financial benefit would be the ability to determine when checks or financial documents arrive to the recipient's city/town, so that financial deposits can be made in a timely manner the day of mail delivery as opposed to when the mail is sent or check is cut. Another advantage to the invention is the ability to track and manage mail volumes and work flow throughout the USPS.

In addition, this invention allows the mailer, or possibly the USPS, to provide the intended recipient with the tracking information before the piece of mail arrives.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for tracking shipped items, said items being handled by at least one intermediate item handling facility prior to reaching a final intended destination, said method comprising the steps of:

assigning a unique code to an item, the unique code including a unique sender identification (ID) that identifies a sender of the item and a unique item identification that identifies the item;

sending said unique code to a database, wherein said sender ID is uniquely associated with the sender;

applying said unique code to said item;

reading said unique code at at least one item handling facility;

querying said database to determine which sender ID is associated with said read code;

sending the unique item identification and data associated with said at least one intermediate item handling facility to said database without a request from the sender; and automatically sending the unique item identification and said data associated with said at least one intermediate item handling facility from said database directly to said sender without a request from the sender.

2. A method according to claim 1, wherein said unique code is a two-dimensional bar code.

3. A method according to claim 1, wherein said database is co-located with said at least one handling facility.

4. A method according to claim 1, wherein said steps of sending are accomplished using the Internet.

5. A method according to claim 1, wherein said step of querying is accomplished over one of a local area network and the Internet.

6. A method according to claim 1, wherein said steps of sending data are accomplished over one of a local area network and the Internet.

7. A program storage device readable by a machine, tangibly embodying a program of instructions executable by a machine to perform method steps for tracking items, said method steps comprising the steps of:

assigning a unique code to an item, the unique code including a unique sender identification (ID) that identifies a sender of the item and a unique item identification that identifies the item;

sending said unique code to a database, wherein said sender ID is uniquely associated with the sender;

applying said unique code to said item;

reading said unique code at at least one intermediate item handling facility;

querying said database to determine which sender ID is associated with said read code;

sending the unique item identification and data associated with said at least one intermediate item handling facility to said database without a request from the sender; and automatically sending the unique item identification and said data associated with said at least one intermediate item handling facility from said database directly to said sender without a request from the sender, wherein said at least one item handling facility includes at least one intermediate item handling facility through which said items pass between said initial shipment location and said final destination.

8. A method according to claim 7, wherein said unique code is a two-dimensional bar code.

9. A method according to claim 7, wherein said database is co-located with said at least one handling facility.

10. A method according to claim 7, wherein said steps of sending are accomplished using the Internet.

11. A method according to claim 7, wherein said step of querying is accomplished over one of a local area network and the Internet.

12. A method according to claim 7, wherein said steps of sending data are accomplished over one of a local area network and the Internet.

13. A system for tracking items, comprising:

means for assigning a unique code to an item, the unique code including a unique sender identification (ID) that identifies a sender of the item and a unique item identification that identifies the item;

means for sending said unique code to a database, wherein said sender ID is uniquely associated with a sender;

means for applying said unique code to said item;

means for reading said unique code at at least one item handling facility;

means for querying said database to determine which sender Identification (ID) is associated with said read code;

means for sending the unique code and data associated with said at least one item handling facility to said database without a request from the sender; and means for automatically sending the unique code and said data associated with said at least one item handling facility from said database directly to said sender without a request from the sender, wherein said at least one item handling facility includes at least one intermediate item handling facility located between an initial location and a final intended destination.

14. A system according to claim 13, wherein said unique code is a two-dimensional bar code.

15. A system according to claim 13, wherein said database is co-located with said at least one handling facility.

16. A system according to claim 13, wherein said means for sending said unique code to said database uses the Internet.

17. A system according to claim 13, wherein said means for querying uses either a local area network, the Internet, or both.

18. A system according to claim 13, wherein said means for sending data from said database to said sender uses the Internet.

* * * * *